United States Patent Office 3,745,014
Patented July 10, 1973

3,745,014
SPECTRALLY SENSITIZED SILVER HALIDE PHOTOGRAPHIC EMULSIONS
Yoshiyuki Nakazawa, Keisuki Shiba, Akira Sato, and Masanaga Ohki, Kanagawa, Japan, assignors to Fuji Photo Film Co., Ltd., Kanagawa, Japan
No Drawing. Filed Apr. 2, 1971, Ser. No. 130,803
Int. Cl. G03c 1/14
U.S. Cl. 96—124
13 Claims

ABSTRACT OF THE DISCLOSURE

A silver halide photographic emulsion spectrally sensitized with a combination of at least one monomethine cyanine dye represented by General Formula I

GENERAL FORMULA I

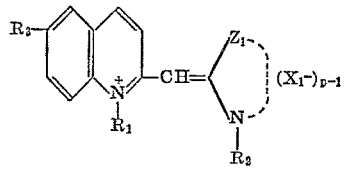

wherein $R_1$ and $R_2$ each represent a member selected from the group consisting of an alkyl group, a substituted alkyl group and an allyl group; $R_3$ represents a member selected from the group consisting of a hydrogen atom and a methyl group; $Z_1$ represents an atomic group necessary to complete a member selected from the group consisting of a 2-quinoline nucleus, a benzothiazole nucleus, a benzoselenazole nucleus, and a naphthothiazole nucleus, the hydrogen atom of said nucleus capable of being substituted; $X_1^-$ represents an acid anion; and $p$ is an integer of 1 or 2; said $p$ being 1 when said $R_1$ or $R_2$ is a substituted alkyl group and the dye takes a betaine structure; at least one of the carbocyanine dyes represented by General Formula II

GENERAL FORMULA II

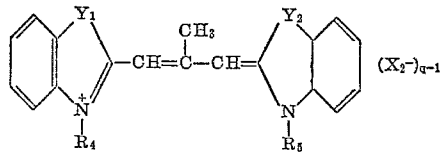

wherein $R_4$ represents a member selected from the group consisting of an ethyl group, an n-propyl group, an n-butyl group, and an allyl group; $R_5$ represents a member selected from the group consisting of a γ-sulfopropyl group, a γ-sulfobutyl group, a δ-sulfobutyl group, a δ-carboxybutyl group, and an ω-carboxypentyl group; $Y_1$ and $Y_2$ represent a member selected from the group consisting of a sulfur atom and a selenium atom; $X_2^-$ represents an acid anion; and $q$ is an integer of 1 or 2, said $q$ is 1 when the dye takes a betaine structure, and at least one carbocyanine dye represented by General Formula III

GENERAL FORMULA III

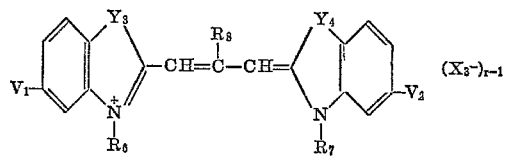

wherein $R_6$ and $R_7$ each represent a member selected from the group consisting of a γ-sulfpropyl group, a γ-sulfobutyl group, a δ-sulfobutyl group, a δ-carboxybutyl group, and an ω-carboxypentyl group; $R_6$ represents a member selected from the group consisting of a methyl group and an ethyl group; $Y_3$ and $Y_4$ each respresent a member selected from the group consisting of a sulfur atom and a selenium atom; $V_1$ and $V_2$ each represent a member selected from the group consisting of a hydrogen atom and a halogen atom; $X_3^-$ represents an acid anion; and $r$ is an integer of 1 or 2, said $r$ being 1 when the dye takes a betaine structure.

BACKGROUND OF THE INVENTION (1) Field of the invention

The present invention is directed to a spectrally sensitized silver halide photographic emulsion and more particularly to a photographic emulsion sensitized uniformly orthopanchromatically over a visible region of from 380 nm. to 650 nm.*

(2) Description of the prior art

For producing a photographic emulsion having a uniformly high sensitivity over a visible region of from 380 nm. to 650 nm., which is one of the objects of this invention, two or more sensitizing dyes are frequently used in combination. In this case, the sensitivity obtained by using a combination of two or more sensitizing dyes is lower than the sensitivity obtained by employing each sensitizing dye alone. However, when a combination of specifically selected dyes is employed, a super-additively higher sensitivity is obtained. The effect of a combination of dyes in such a manner is known as "supersensitization" and it is one of the objects of this invention to discover such an effective combination.

It is particularly known that a green sensitivity distribution over 560–580 nm. and a red sensitivity distribution over 630–650 nm. provide important influences on the improvement in the tone reproduction for unexposed light-sensitive photographic films sensitized orthopanchromatically. Among them, it is desirable that the red sensitivity distribution has a maximum spectral sensitivity at 635 nm. and also a gently inclining spectral sensitivity up to amount 650 nm.

Another object of this invention is to obtain a spectral sensitivity having a gentle sensitivity distribution up to about 650 nm. without reducing the maximum sensitivity at 630–640 nm., while maintaining a high white-light sensitivity of a silver halide photographic emulsion.

SUMMARY OF THE INVENTION

The objects of this invention can be achieved by incorporating a combination of at least one monomethine cyanine dye as shown by the following General Formula I, at least one carbocyanine dye as shown by the following General Formula II and at least one carbocyanine dye as shown by the following general Formula III in a silver halide photographic emulsion:

GENERAL FORMULA I

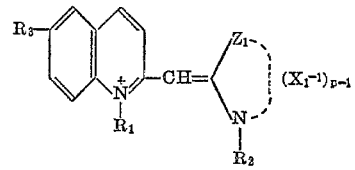

wherein $R_1$ and $R_2$ each represent an alkyl group (such as methyl group, an ethyl group, a propyl group and the like), a substituted alkyl group (such as an acetoxyalkyl group (e.g. an acetoxypropyl group), a sulfo alkyl group (e.g. a δ-sulfobutyl group) a hydroxyalkyl group (e.g. a hydroxyethyl group, and the like), or an allyl group; $R_3$

*Nano meter (minus 9 power of 1 meter).

represents a hydrogen atom or a methyl group; $Z_1$ represents an atomic group necessary to complete a 2-quinoline nucleus, a benzothiazole nucleus, a benzoselenazole nucleus, or a naphthothiazole nucleus, and the hydrogen atom of each of said nuclei may have been substituted; $X_1$ represents an acid anion; and $p$ is an integer of 1 or 2, said $p$ being 1 when said $R_1$ and $R_2$ is a substituted alkyl group and said dye forms an intromolecular salt forming a betaine structure;

GENERAL FORMULA II

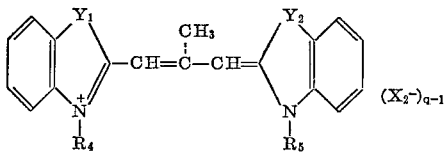

wherein $R_4$ represents an ethyl group, an n-propyl group, an n-butyl group, or an allyl group; $R_5$ represents a γ-sulfopropyl group, a γ-sulfobutyl group, a δ-sulfobutyl group, a δ-carboxybutyl group, or a ω-carboxypentyl group; $Y_1$ and $Y_2$ each represent a sulfur atom or a selenium atom; $X_2^-$ represents an acid anion; and $q$ is an integer of 1 or 2, said $q$ being 1 when the dye takes a betaine structure; and

GENERAL FORMULA III

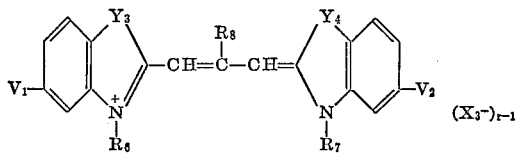

wherein $R_6$ and $R_7$ each represent a γ-sulfopropyl group, a γ-sulfobutyl group, a δ-sulfobutyl group, a δ-carboxybutyl group, or a ω-carboxypentyl group; $R_8$ represents a methyl group or an ethyl group; $Y_3$ and $Y_4$ each represent a sulfur atom or a selenium atom; $V_1$ and $V_2$ each represent a halogen atom or a hydrogen atom; $X_3^-$ represents an acid anion; and $r$ is an integer of 1 or 2, said $r$ is 1 when the dye takes a betaine structure.

As the acid anion employed above, there are illustrated a chlorine ion, a bromine ion, an iodine ion, a perchlorate ion, a p-toluenesulfonate ion, a benzenesulfonate ion, an ethylsulfate ion, and a methylsulfate ion.

DETAILED DESCRIPTION OF THE INVENTION

It is particularly desirable for achievement of the above-mentioned objects that said monomethine cyanine dyes of the General Formula I be a combination of dyes shown by the following General Formula Ia with Ib:

GENERAL FORMULA Ia

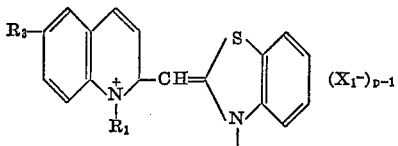

GENERAL FORMULA Ib

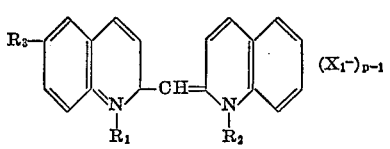

wherein $R_1$, $R_2$, $R_3$, $X_1$, $p$ each have the same definitions as those of General Formula I.

The sensitizing dye represented by the General Formula I has its spectral sensitivity at the green region, but the sensitivity is quite low when the dye is used alone. However, the dye shows a high sensitivity when it is used together with the carbocyanine dye represented by the General Formula II or the General Formula III, and particularly together with the carbocyanine dye of the General Formula II. The dye of the General Formula I also is characterized in that it reduces less the red sensitivity of the J-aggregate formed by the dye of the General Formula II.

The sensitizing dye represented by the General Formula II has such a structural feature that the dye is a carbocyanine dye having the specific N-substituent $R_4$ or $R_5$ and also has substituted thereto, a methyl group at the meso position thus giving the maximum sensitivity near about 650 nm. This results in providing the excellent feature of forming the stable J-aggregate which is damaged less by other dyes used together, an antifoggant, a stabilizer, etc., in comparison with the properties of a general carbocyanine dye having a methyl group at the meso position. In spite of these merits, the combination of the dyes of the General Formula I with II causes the tone reproduction to deteriorate as the J-band falls too sharp at longer wavelengths. This fault improved by employing together, the carbocyanine dye represented by General Formula III, and also by employing the dye of General Formula III together. When this is done, the white-light sensitivity of the emulsion can be increased without reducing the J-band by the carbocyanine dye represented by the General Formula II. Another feature of the carbocyanine dye represented by the General Formula III is that both N-substituents are alkyl groups having each a sulfone group or a carboxyl group, whereby harmful action during development is prevented and the high sensitivity and the granularity of the image are reduced.

The sensitizing dyes represented by the General Formulae I, II and III used in this invention may be prepared by known processes.

For instance, they may be easily produced by referring to the specifications of U.S. Pat. No. 2,503,776; German Pat. No. 929,080 and German Pat. No. 1,072,765.

Examples of the sensitizing dyes applicable to this invention are shown below, although the invention is not limited to these alone.

(I-a):

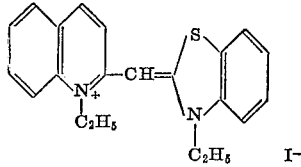

(I-b):

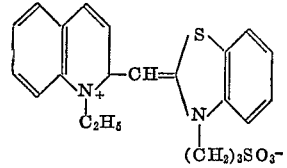

(I-c):

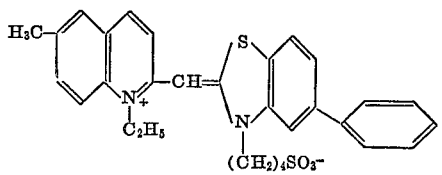

(I-d):

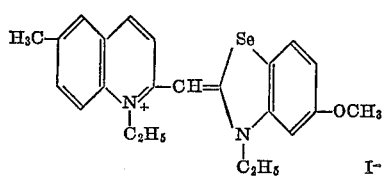

(I-e): 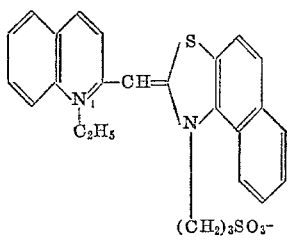

(I-f) 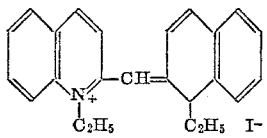

(I-g) 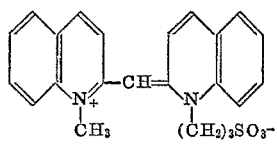

(I-h) 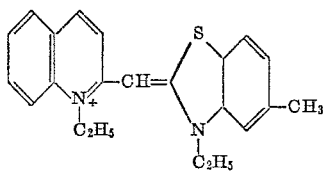

(I-i) 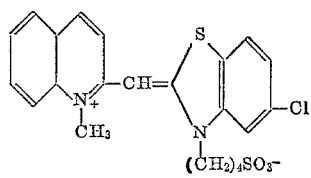

(II-a) 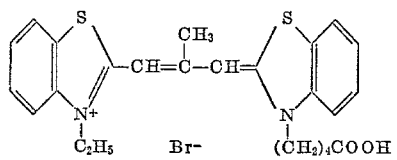

(II-b) 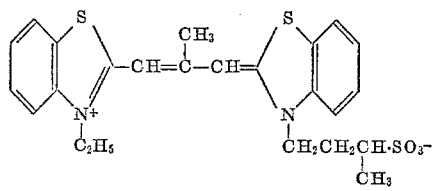

(II-c) 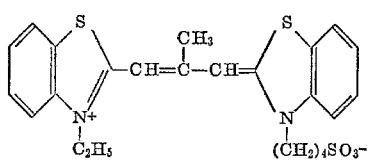

(II-d) 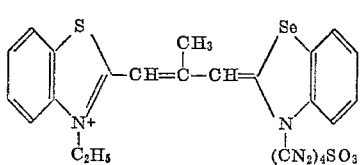

(III-a) 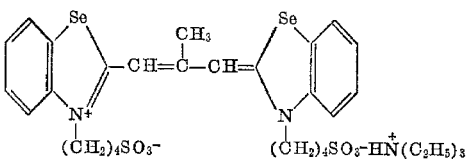

(III-b) 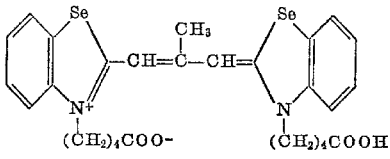

(III-c) 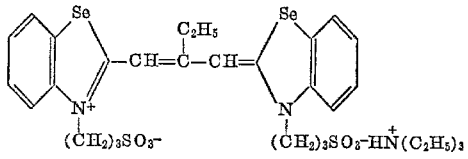

(III-d) 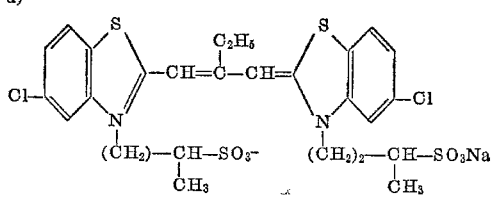

(A) 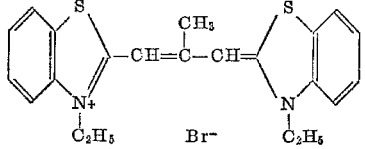

(B) 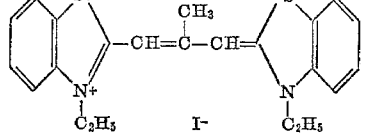

(C) 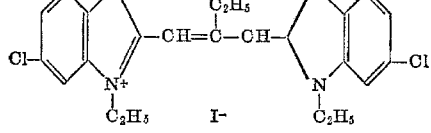

The sensitizing dyes of this invention are dissolved in aqueous solutions or a water-miscible organic solvent (e.g., methanol, ethanol, acetone, methyl Cellosolve, and pyridine) and incorporated in a silver halide emulsion separately or as a mixture. Ultrasonic waves may be applied to the system for stirring and accelerating the resolution of the dyes. In accordance with the manner for producing light-sensitive materials the amounts of the sensitizing dyes, the order of adding them, and the manner of adding them may be properly changed by those skilled in the art. The amount of the sensitizing dyes to be incorporated in the silver halide emulsion is preferably from $1 \times 10^{-6}$ mole to $5 \times 10^{-4}$ mole per mole of silver halide contained in the silver halide emulsion. The ratio by mole of the sensitizing dyes (II) to (III) to be incorporated in combination in the silver halide emulsion is preferably from 1:⅕ to 1:3 and the ratio by mole of the sensitizing dyes (II) to (I) is preferably from 1:1/10 to 1:5.

As the silver halide emulsion used in this invention, there are silver iodobromide emulsion, a silver iodochlorobromide emulsion, and a silver chlorobromide emulsion. For obtaining a high sensitivity, it is preferable to use a silver iodobromide emulsion sensitized chemically by a sulfur sensitization, a reduction sensitization, or a noble metal salt sensitization, or a combination of them. Also, an antifoggant, a stabilizer, a sensitizer, a surface active agent, a hardening agent, a plasticizer, etc., may be added to the silver halide emulsion containing the sensitizing dyes of this invention. Further, other water-soluble polymers may be used in place of gelatin. Also, other photographic dyes may be used. The silver halide emulsion is coated on a proper support, such as a cellulose derivative film, polyethylene terephthalate film, a polycarbonate film, a baryta-coated paper, a resin-coated paper, a synthetic paper and glass sheet.

The present invention will be better understood from the following examples, which are merely illustrative and not limitative of the present invention:

EXAMPLE

One kilogram of a silver iodobromide emulsion containing 6 mole percent of iodine was melted in a vessel by heating. While maintaining the silver halide emulsion at 40° C., the prescribed amounts of the sensitizing dyes were added to the silver halide emulsion with stirring in a methanol solution thereof, after adding thereto 0.4 g. of a stabilizer, 5-methyl-7-oxy-1,3,4-trizazindridine as a methanol solution thereof and a surface active agent for coating, the silver halide emulsion thus prepared was coated onto a film and dried to give a light-sensitive material.

The sample film was cut into pieces and the sample film was wedge exposed to a light source of a color temperature of 2666° K. through a yellow filter K–12 (or a red filter K–7) made by the Fuji Photo Film Co., Ltd. by means of a sensitometer having a light source converted by using a Davis-Gibson filter to a color temperature of 5400° K. Another sample film thus cut was exposed by means of a GR–2 type diffraction grating spectrophotograph made by Narumi Shokai.

The samples exposed were then developed for 7 minutes at 20° C. using a developing solution having the following composition:

COMPOSITION FOR THE DEVELOPING SOLUTION

| | G. |
|---|---|
| N-methyl-p-aminophenol sulfate | 2 |
| Hydroquinone | 5.0 |
| Sodium sulfite | 100 |
| Borax | 2.0 |
| Water added to make 1 liter. | |

TABLE 1

| No. | Dye of General Formula I Comp. | Used amt. ×10⁻⁵ mole | Dye of General Formula II Comp. | Used amt. ×10⁻⁵ mole | Dye of General Formula III Comp. | Used amt. ×10⁻⁵ mole | Relative spectral sensitivity Sy | Sr | (nm.) |
|---|---|---|---|---|---|---|---|---|---|
| 1 | Ia | 8 | | | | | 100 | | 538 |
| | | | IIc | 8 | | | 600 | 170 | 630 |
| | Ia | 1 | IIc | 6 | | | 680 | 170 | 630 |
| | | | | | IIId | 8 | 400 | 200 | 662 |
| | Ia | 1 | IIc | 6 | IIId | 0.25 | 700 | 200 | 632 |
| | Ia / Ig | ¹1 / 1 | IIc | ¹1 / 1 | IIId | 0.25 | 730 | 240 | 632 |
| 2 | Ic | 2 | IIa | 6 | | | 600 | 180 | 628 |
| | | | | | IIIc | 8 | 680 | 200 | 650 |
| | Ic | 2 | IIa | 6 | IIIc | 0.3 | 760 | 200 | 632 |
| 3 | Ib / If | ¹1 / 1 | IIb | 6 | | | 650 | 160 | 628 |
| | | | | | IIIb | 8 | 650 | 180 | 650 |
| 3 | Ib / If | ¹1 / 1 | IIb | 6 | IIIb | 0.3 | 780 | 180 | 630 |
| 4 | Ig | 8 | | | | | 70 | | 580 |
| | | | IId | 8 | | | 450 | 160 | 636 |
| | Ig | 2 | IId | 6 | | | 560 | 160 | 634 |
| | | | | | IIIa | 8 | 600 | 180 | 650 |
| | Ig | 2 | IId | 6 | IIIa | 0.25 | 750 | 180 | 636 |
| 5 | I-d | 1 | II-c | 5 | | | 660 | 170 | 630 |
| | I-d | 1 | II-c | 5 | III-c | | 680 | 200 | 632 |
| 6 | | | A | 8 | | | 450 | 130 | 630 |
| | Ig | 2 | A | 6 | | | 450 | 130 | 628 |
| | | | | | IIIb | 8 | 650 | 180 | 650 |
| 7 | Ig | 2 | A | 6 | IIIb | 0.3 | 450 | 110 | 628 |
| | Ie | 2 | IIa | 6 | IIIc | 0.25 | 600 | 200 | 630 |
| | Ie | 2 | IIa | 6 | | | 550 | 180 | 628 |
| | | | | | B | 8 | 360 | 180 | 650 |
| | Ie | 2 | IIa | 6 | B | 0.25 | 500 | 140 | 626 |
| 8 | Ig | 2 | IId | 6 | IIId | 0.2 | 580 | 299 | 632 |
| | Ig | 2 | IId | 6 | | | 560 | 160 | 634 |
| | | | | | C | 8 | 380 | 200 | 660 |
| | Ig | 2 | IId | 6 | C | 0.2 | 400 | 140 | 634 |
| 9 | | | IIc | 5 | IIIc | 0.3 | 670 | 190 | 632 |
| | Ih | 8 | | | | | 100 | | 530 |
| | Ih | 1 | IIc | 5 | IIIc | 0.3 | 700 | 200 | 632 |
| 10 | Ii | 8 | | | | | 80 | | 540 |
| | Ii | 1 | IIc | 5 | IIIc | 0.3 | 680 | 200 | 632 |
| 11 | Ia | 1 | IIc | 5 | IIIc | 0.3 | 710 | 210 | 632 |
| | Ig | 1 | IIc | 5 | IIIc | 0.3 | 700 | 200 | 634 |
| | Ia / Ig | ¹1 / 1 | IIc | ¹1 / 1 | IIIc | 0.3 | 730 | 220 | 634 |

¹ Mixture.

From the strips obtained, the density was measured by using an S-type densitometer made by Fuji Photo Film Co., Ltd.; the yellow filter sensitivity ($S_y$), the red filter sensitivity ($S_r$), and the maximum sensitivity wavelength ($\lambda_{max}$) were determined as relative values. The standard point of the optical density to determine the sensitivities was a point of fog+0.1. The results are shown in Table 1.

From the foregoing results, the merits of the present invention, as mentioned before, will be readily apparent to those skilled in the art.

Although the present invention has been adequately described in the foregoing specification and examples included therein, it is readily apparent that various changes and modifications may be made without departing from the scope and spirit thereof.

What is claimed is:

1. A silver halide photographic emulsion spectrally sensitized with a combination of at least one monomethine cyanine dye represented by General Formula I:

GENERAL FORMULA I

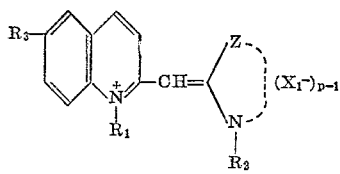

wherein $R_1$ and $R_2$ each represent a member selected from the group consisting of an alkyl group, a substituted alkyl group selected from the group consisting of an acetoxyalkyl group, a sulfoalkyl group and a hydroxyalkyl group and an allyl group; $R_3$ represents a member selected from the group consisting of a hydrogen atom and a methyl group; Z represents atomic group necessary to complete a member selected from the group consisting of a 2-quinoline nucleus, a benzothiazole nucleus, a benzoselenazole nucleus, and a naphthothiazole nucleus, the hydrogen atom of said nucleus capable of being substituted; $X_1^-$ represents an acid anion; and $p$ is an integer of 1 to 2; and $p$ being 1 when said $R_1$ or $R_2$ is a substituted alkyl group and the dye takes a betaine structure; at least one of the carbocyanine dyes represented by General Formula II:

GENERAL FORMULA II

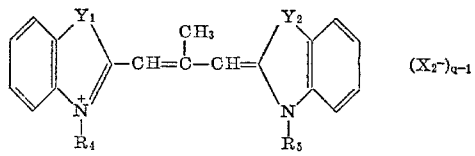

wherein $R_4$ represents a member selected from the group consisting of an ethyl group, an n-propyl group, an n-butyl group, and an allyl group; $R_5$ represents a member selected from the group consisting of a γ-sulfopropyl group, a γ-sulfobutyl group, a δ-sulfobutyl group, a δ-carboxybutyl group, and a ω-carboxypentyl group; $Y_1$ and $Y_2$ each represent a member selected from the group consisting of a sulfur atom and a selenium atom; $X_2$ represents an acid anion; and $q$ is an integer of 1 or 2, said $q$ is 1 when the dye takes a betaine structure, and at least one carbocyanine dye represented by General Formula III:

GENERAL FORMULA III

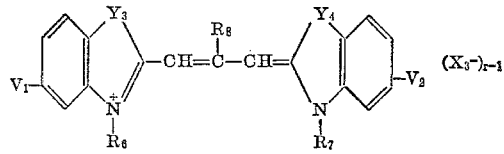

wherein $R_6$ and $R_7$ each represent a member selected from the group consisting of a γ-sulfopropyl group, a γ-sulfobutyl group, a δ-sulfobutyl group, a δ-carboxybutyl group, and a ω-carboxypentyl group; $R_8$ represents a member selected from the group consisting of a methyl group and an ethyl group; $Y_3$ and $Y_4$ each represents a member selected from the group consisting of a sulfur atom and a selenium atom; $V_1$ and $V_2$ each represent a member selected from the group consisting of a hydrogen atom and a halogen atom; $X_3^-$ represents an acid anion; and $r$ is an integer of 1 or 2; said $r$ being 1 when the dye takes a betaine structure.

2. A silver halide photographic emulsion spectrally sensitized with a combination of at least one monomethine cyanine dye represented by General Formula I:

GENERAL FORMULA I

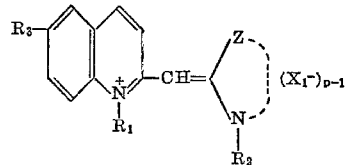

wherein $R_1$, $R_2$, $R_3$, $X_1$ and $p$ each have the same definitions as those of General Formula I of claim 1, at least one carbocyanine dye represented by General Formula II:

GENERAL FORMULA II

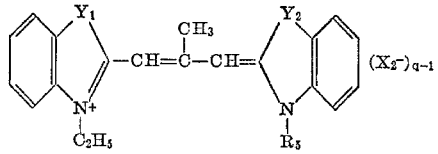

wherein $Y_1$, $Y_2$, $R_5$, $X_2$ and $q$ each have the same definitions as those of General Formula II of claim 1, and at least one carbocyanine dye represented by General Formula II:

GENERAL FORMULA III

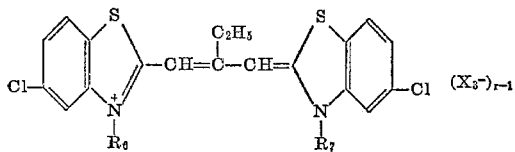

wherein $R_6$, $R_7$ $X_3$ and $r$ each have the same definitions as those of General Formula III in claim 1.

3. A silver halide photographic emulsion spectrally sensitized with a combination of at least one of the monomethine cyanine dyes represented by General Formulas Ia or Ib:

GENERAL FORMULA Ia

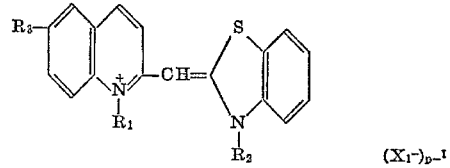

GENERAL FORMULA Ib

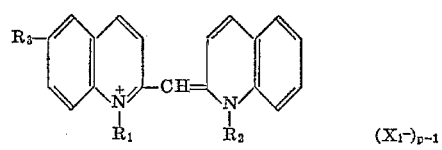

wherein $R_1$, $R_2$, $R_3$, X and $p$ each have the same definitions as those of General Formula I of claim 1; at least one of the carbocyanine dyes represented by the General Formula II:

GENERAL FORMULA II

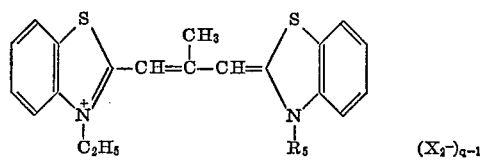

wherein $R_5$, $X_2$, and $q$ each have the same definitions as those of General Formula II of claim 1, and a carbocyanine dye represented by the following formula:

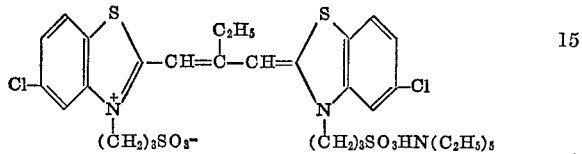

4. The silver halide photographic emulsion of claim 1 wherein the substituted alkyl group of $R_1$ and $R_2$ is a member selected from the group consisting of an acetoxyalkyl group, a sulfoalkyl group and a hydroxy alkyl group.

5. The silver halide photographic emulsion of claim 1, wherein the amount of the sensitizing dye represented by the General Formulas I, II and III ranges from $1\times10^{-6}$ moles to $5\times10^{-4}$ moles per mole of the silver halide.

6. The silver halide photographic emulsion of claim 1, wherein the mole ratio of the sensitizing dyes (II) to (III) is 1:⅕ to 1:3 and the mole ratio of the sensitizing dyes (II) to (I) is 1:1/10 to 1:5.

7. A photographic light-sensitive element comprising a layer containing the silver halide photographic emulsion of claim 1.

8. The silver halide photographic emulsion of claim 2 wherein the substituted alkyl group of $R_1$ and $R_2$ is a member of the group consisting of an acetoxyalkyl group, a sulfoalkyl group and a hydroxyalkyl group.

9. The silver halide photographic emulsion of claim 2, wherein the amount of the sensitizing dyes represented by the General Formulas I, II and III ranges from $1\times10^{-6}$ mol to $5\times10^{-4}$ mol pe mol of the silver halide.

10. The silver halide photographic emulsion of claim 2, wherein the mol ratio of the sensitizing dyes (II) (III) is 1:⅕ to 1:3 and the mol ratio of the sensitizing dyes (II) to (I) is 1:1/10 to 1:5.

11. The silver halide photographic emulsion of claim 1, wherein the dye of Formula I is a member selected from the group consisting of

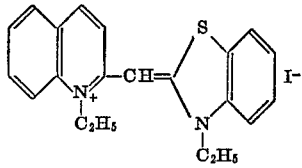

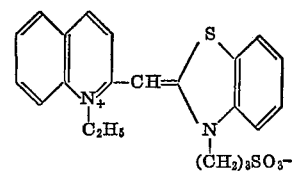

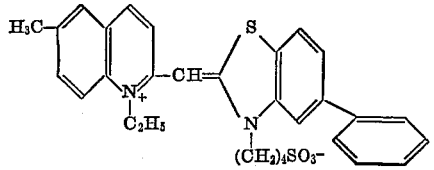

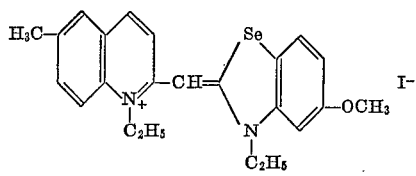

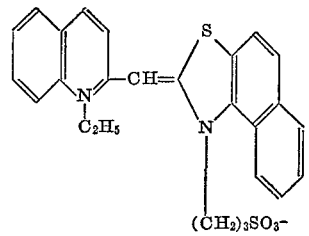

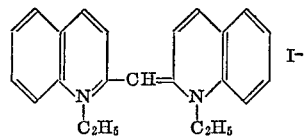

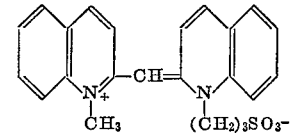

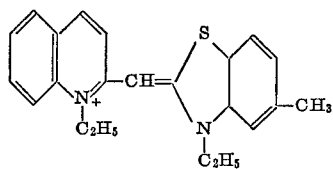

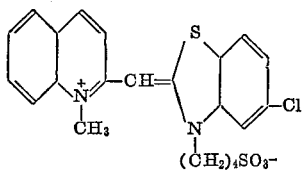

12. The silver halide photographic emulsion of claim 1, wherein the dye of Formula II is a member selected from the group consisting of:

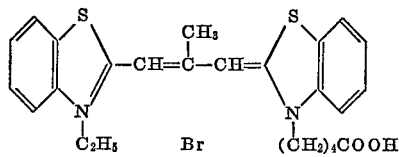

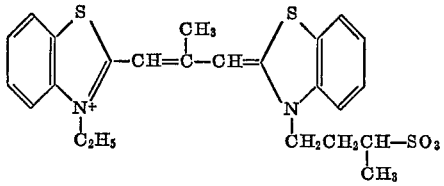

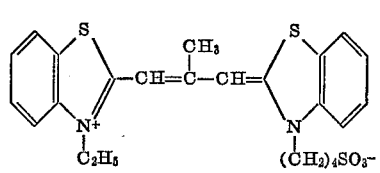

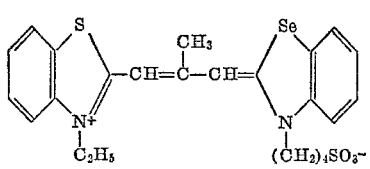
13. The silver halide photographic emulsion of claim 1, wherein the dye of Formula III is a member selected from the group consisting of:
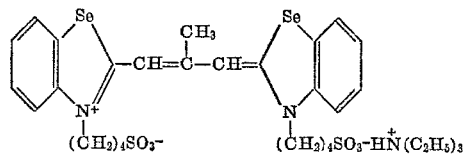
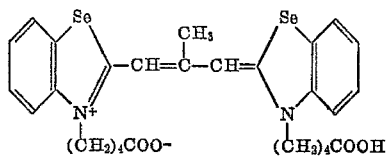
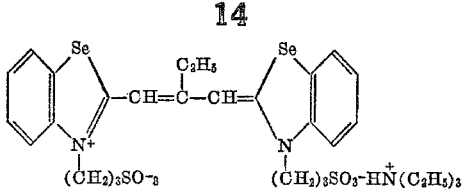
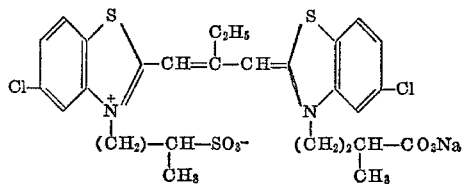
References Cited
UNITED STATES PATENTS
| | | | |
|---|---|---|---|
| 2,430,072 | 11/1947 | Nicholson et al. | 96—124 |
| 3,348,949 | 10/1967 | Bannert et al. | 96—124 |
| 3,463,640 | 8/1969 | Ficken et al. | 96—124 |
| 3,527,641 | 9/1970 | Nakazawa et al. | 96—124 |
| 3,615,609 | 10/1971 | Fry et al. | 96—124 |
J. TRAVIS BROWN, Primary Examiner
U.S. Cl. X.R.
96—131, 132, 137

UNITED STATES PATENT OFFICE
CERTIFICATE OF CORRECTION

Patent No. 3,745,014            Dated July 10, 1973

Inventor(s) YOSHIYUKI NAKAZAWA ET AL

It is certified that error appears in the above-identified patent and that said Letters Patent are hereby corrected as shown below:

<u>In the Heading</u>

The claim to Priority was omitted. Should read:

April 2, 1970 ......................Japan, ............28171/70

Signed and sealed this 20th day of November 1973.

(SEAL)
Attest:

EDWARD M. FLETCHER, JR.          RENE D. TEGTMEYER
Attesting Officer                    Acting Commissioner of Patents